Figure 1:
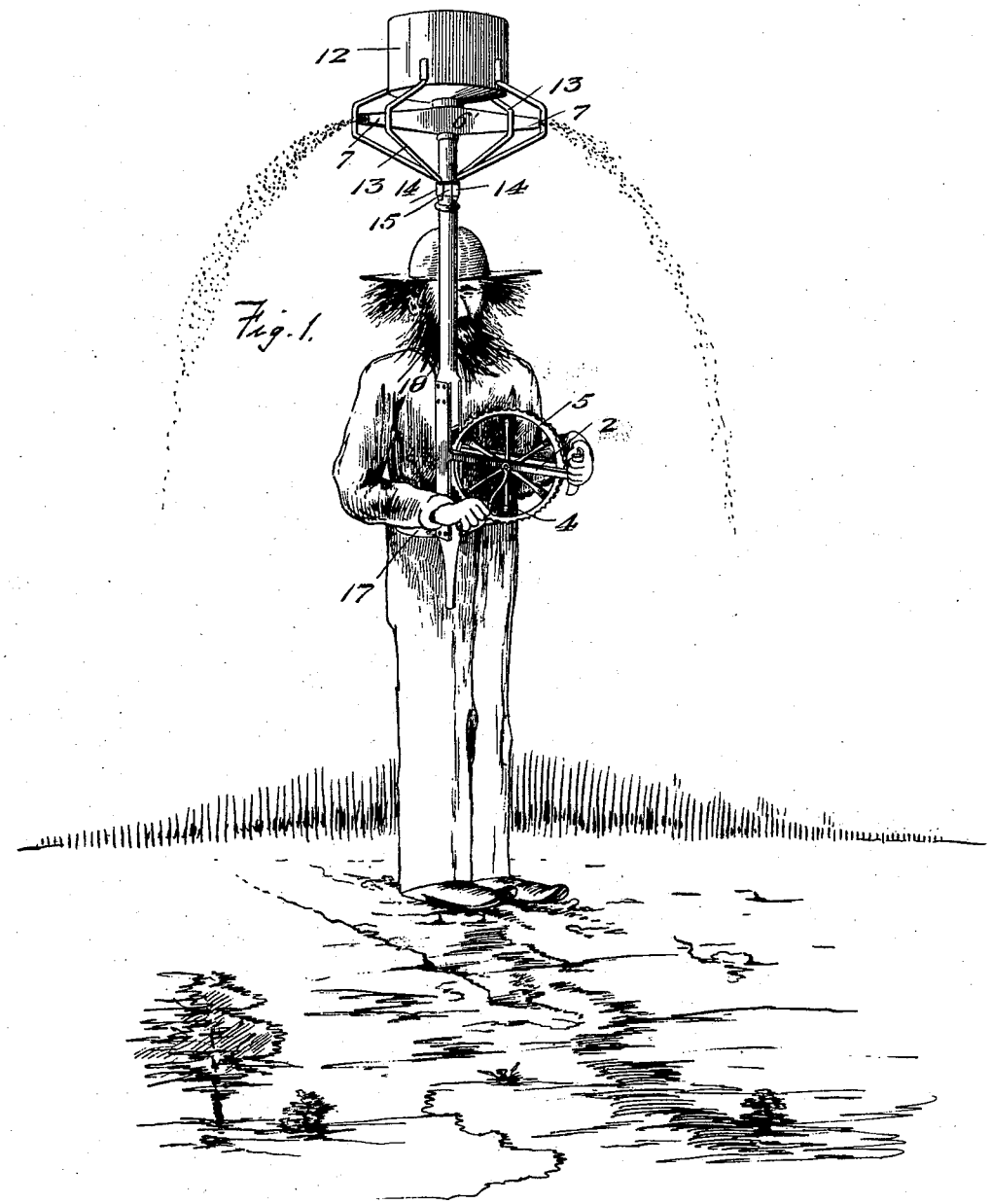

(No Model.) 2 Sheets—Sheet 1.

W. TAYLOR.
SEED DISTRIBUTER.

No. 588,367. Patented Aug. 17, 1897.

Witnesses
Wm C Dashiell
H. J. Smith

Inventor
William Taylor
by H. B. Wilson
Attorney

THE NORRIS PETERS CO., PHOTO-LITHO., WASHINGTON, D. C.

(No Model.) 2 Sheets—Sheet 2.
W. TAYLOR.
SEED DISTRIBUTER.
No. 588,367. Patented Aug. 17, 1897.
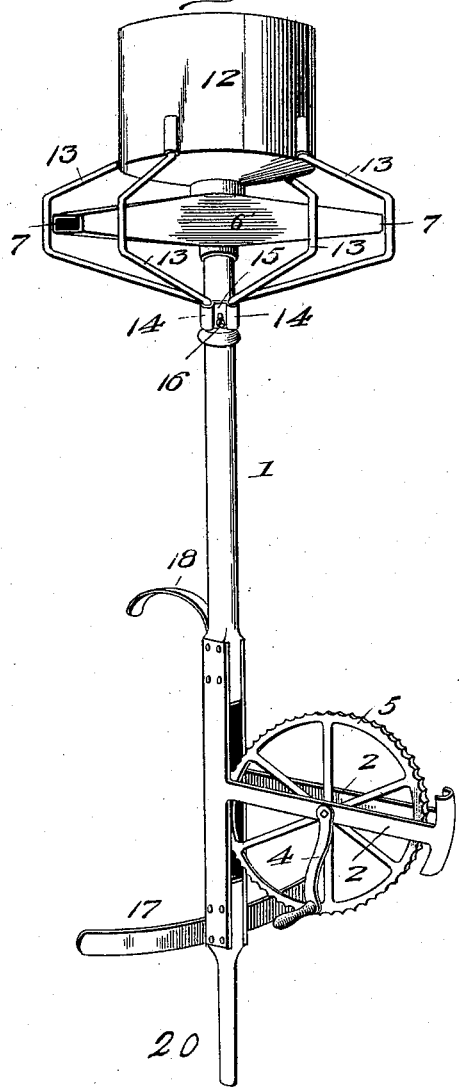
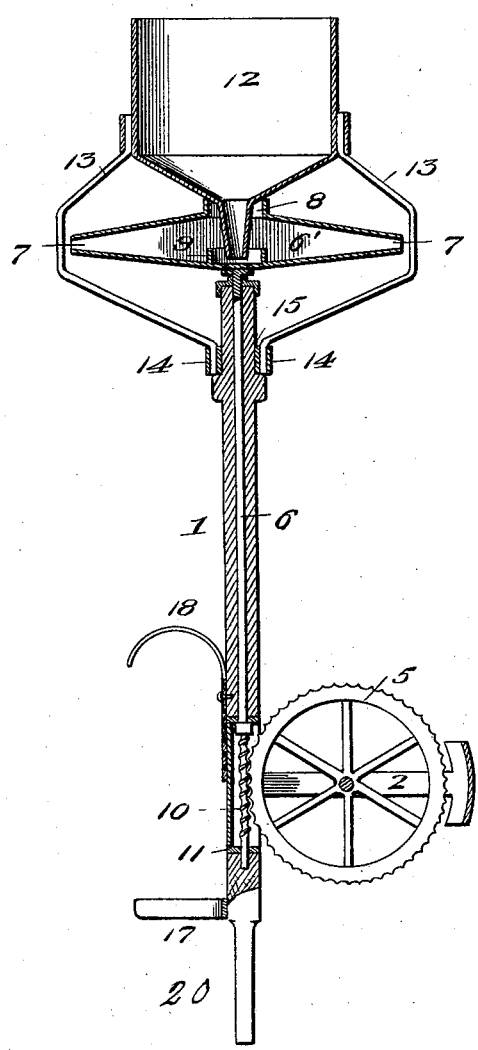
Witnesses
Inventor
William Taylor
by H. B. Wilson
Attorney

UNITED STATES PATENT OFFICE.

WILLIAM TAYLOR, OF UNION CITY, TENNESSEE.

SEED-DISTRIBUTER.

SPECIFICATION forming part of Letters Patent No. 588,367, dated August 17, 1897.

Application filed February 10, 1897. Serial No. 622,852. (No model.)

*To all whom it may concern:*

Be it known that I, WILLIAM TAYLOR, a citizen of the United States, residing at Union City, in the county of Obion and State of Tennessee, have invented certain new and useful Improvements in Seed-Distributers; and I do declare the following to be a full, clear, and exact description of the invention, such as will enable others skilled in the art to which it appertains to make and use the same.

My invention relates to a seed-distributer. The object is to provide a seed-distributer which shall be simple of construction, durable in use, and comparatively inexpensive of production and which may be easily carried by the operator.

With these objects in view the invention consists of certain features of construction and combination of parts, which will be hereinafter more fully described and claimed.

In the accompanying drawings, Figure 1 is a view of my seed-distributer, showing the manner in which it is supported by the operator. Fig. 2 is a perspective view, and Fig. 3 is a longitudinal sectional view.

In the drawings, 1 denotes a frame or support, which is tubular in form; 2, bracket-plates bolted to its lower end, from which project laterally arms; 4, the handle, and 5 a worm-wheel journaled between the bracket-arms.

6 denotes a shaft which extends vertically through the support and has fixed to its upper end a distributer 6', which has contracted outlets 7 and an inlet 8 and a pan 9, into which the seed is deposited. The lower end of the shaft is connected to the worm 10, journaled in a cross-bar 11 of the bracket-plate.

12 denotes a hopper having arms 13, projecting outwardly and secured in sockets 14 of a vertically adjustable sleeve 15, which is held in its adjustment by set-screw 16. The bottom of the hopper is preferably conical and is provided with a discharge-spout, which empties into the cup in the rotary distributer.

17 denotes a curved support which is adapted to bear against the operator about at his waist-line, and 18 represents a hook-shaped bar which is adapted to lay over the operator's shoulder. This bar is made adjustable, so as to accommodate persons of different builds.

The device being supported by the operator, as shown in Fig. 1, the crank of the worm-wheel is turned, which engages the worm on the distributing-shaft, causing the distributer to be rapidly rotated, thus throwing broadcast the seeds that drop from the hopper into the distributer. By means of the handle 20 at the lower end of the bracket-plates the machine is balanced and prevented from falling while the crank is being rotated.

By adjustably connecting the hopper to the support I regulate the amount of seed supplied to the distributer.

Having thus described my invention, what I claim, and desire to secure by Letters Patent of the United States, is—

The combination of a tubular support, a shaft journaled therein, and having at one end a worm, and at its upper end a distributer having an inlet in its top, and having contracted outlets, a pan secured in said distributer, a feed-hopper adjustably supported above said distributer and having a spout which projects through the inlet of said distributer into close proximity to the pan therein; brackets secured to the lower end of the tubular support, a worm-wheel journaled in said brackets and meshing with the worm, a crank for turning the worm-wheel, and means for attaching the device to the operator.

In testimony whereof I hereunto affix my signature in presence of two witnesses.

WILLIAM TAYLOR.

Witnesses:
 CHAS. D. GIBBS,
 CHAS. COLLEY.